May 22, 1962 H. J. PLEIMAN 3,035,705
MILK STRAINER
Filed July 10, 1958
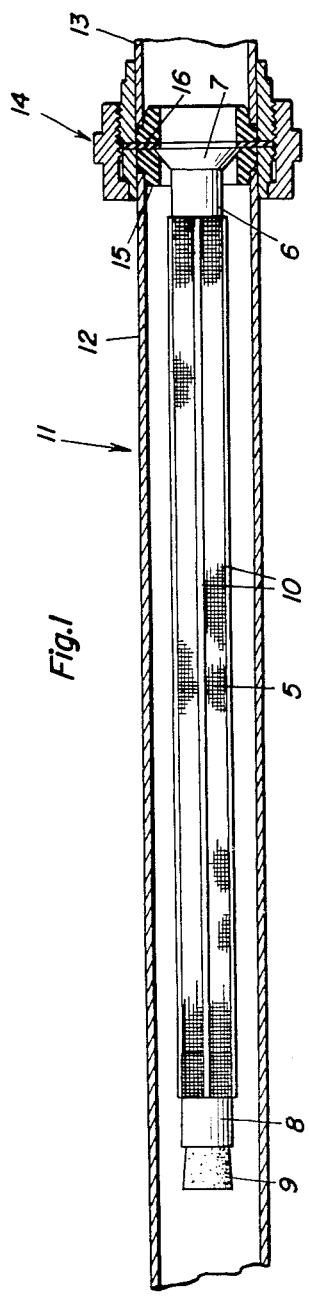
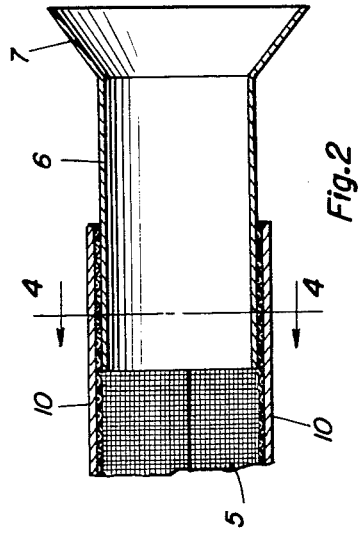
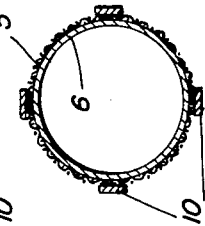
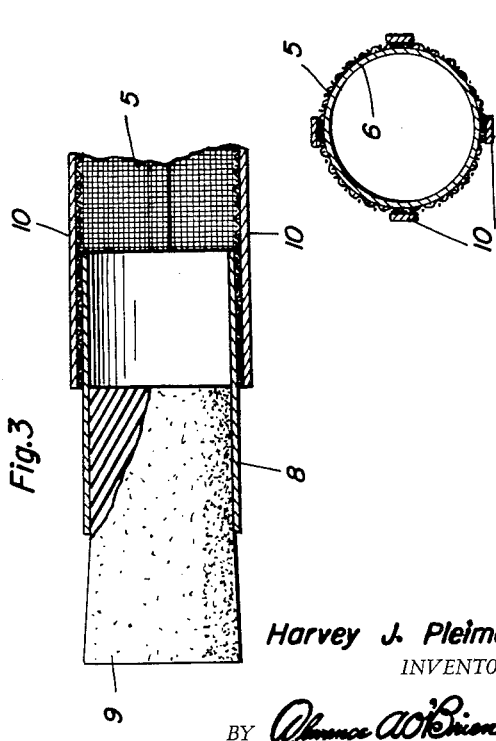
Harvey J. Pleiman
INVENTOR.
BY
Attorneys United States Patent Office 3,035,705
Patented May 22, 1962

3,035,705
MILK STRAINER
Harvey J. Pleiman, R.R. 2, Sidney, Ohio
Filed July 10, 1958, Ser. No. 747,613
2 Claims. (Cl. 210—445)

This invention relates to new and useful improvements in strainers particularly for milking machines and has for one of its important objects to provide, in a manner as hereinafter set forth, a device of this character comprising a tubular or cylindrical filter screen of stainless steel or other suitable metal which may be readily inserted for use at any desired point in the usual glass milk line between the cow and the can or tank.

Another very important object of the present invention is to provide an in-line milk strainer of the aforementioned character which may be easily cleaned and maintained in a highly sanitary condition at all times.

Other objects of the invention are to provide a milk strainer of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in vertical longitudinal section through a portion of a glass milk line, showing a strainer embodying the present invention in position therein;

FIGURE 2 is an enlarged view in longitudinal section through the forward end portion of the device;

FIGURE 3 is a longitudinal sectional view through the other or rear end portion of the device; and FIGURE 4 is a view in transverse section, taken substantially on the line 4—4 of FIGURE 2.

Referring now to the drawing in detail, it will be seen that the embodiment of the invention which has been illustrated comprises an elongated cylindrical or tubular metallic screen 5 of suitable length and diameter. Mounted in one end portion of the screen 5 and projecting longitudinally therefrom is a metallic intake tube 6. The tube 6 terminates in a substantially conical or flared outer end portion or funnel 7.

Mounted in the other end portion of the screen 5 and projecting longitudinally therefrom is a metallic tube 8 which is of uniform diameter from end-to-end. The tube 8 is closed by a tapered plug or stopper 9 of rubber or other suitable resilient material.

Mounted longitudinally on the screen 5 is a plurality of equidistantly spaced, parallel metallic stiffening bars 10. As shown to advantage in FIGURES 2 and 3 of the drawing, the bars 10 and the screen 5 are of equal length. The bars 10, the screen 5 and the tubes 6 and 8 are preferably spot welded together.

In FIGURE 1 of the drawing, reference character 11 designates generally a conventional glass milk line of a milking machine comprising sections 12 and 13 joined by a coupling 14. The strainer of the present invention is adapted to be mounted longitudinally in the line 11 in spaced, concentric relation thereto. This is readily accomplished by clamping the flared end portion 7 of the mounting tube 6 between one of the usual rubber packing rings 15 and the washer 16 of the coupling 14. Of course, milk being drawn by suction through the line 11 enters the strainer through the screen 5 and returns to the line through the tube 6. The screen 5 may be of any suitable mesh. The device may be readily removed from the line when desired by uncoupling the coupling 14. The removable plug or stopper 9 permits a brush to be inserted through the device for thoroughly cleaning the interior thereof. The complete strainer, with the exception of the plug or stopper, is of stainless steel or other suitable metal. The bars 10 stiffen the assembly and prevent stagging or bending.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a section line for milking machines having a coupling joint therein connecting axially aligned conduit sections of said suction line, a strainer comprising an elongated tubular screen of a uniform diameter throughout its length defining an unobstructed passageway, non-porous tubes of uniform diameter fixed in end portions of said screen and projecting longitudinally therefrom, a funnel on the outer end of one of the tubes in sealed engagement in said coupling joint for removably mounting the strainer within one conduit section in concentric relation thereto and longitudinally extending away from the coupling joint, a plurality of parallel stiffening bars mounted longitudinally on the periphery of the screen at circumferentially spaced points, said bars being coextensive with the screen and affixed thereto, and a resilient stopper mounted in the other of said tubes closing one end of the unobstructed passageway and projecting longitudinally therefrom to facilitate removal of said stopper whereby the strainer is substantially unobstructed from end to end for the passage therethrough of a cleaning implement when said strainer is removed from the one conduit section.

2. The combination of claim 1 wherein said outer funnel end of said one tube is clamped between adjacent ends of the conduit sections by the coupling joint with an adjacent end portion of the tubular screen being axially spaced from the coupling joint so that no liquid flows through the screen in the vicinity of the coupling joint.

References Cited in the file of this patent

UNITED STATES PATENTS

| 811,151 | Kneuper | Jan. 30, 1906 |
| 1,348,536 | Billings et al. | Aug. 3, 1920 |
| 2,390,841 | Longden | Dec. 11, 1945 |
| 2,658,625 | Rafferty | Nov. 10, 1953 |

FOREIGN PATENTS

| 692,295 | Switzerland | Oct. 29, 1914 |
| 696,320 | France | Dec. 29, 1930 |